United States Patent Office 3,560,224
Patented Feb. 2, 1971

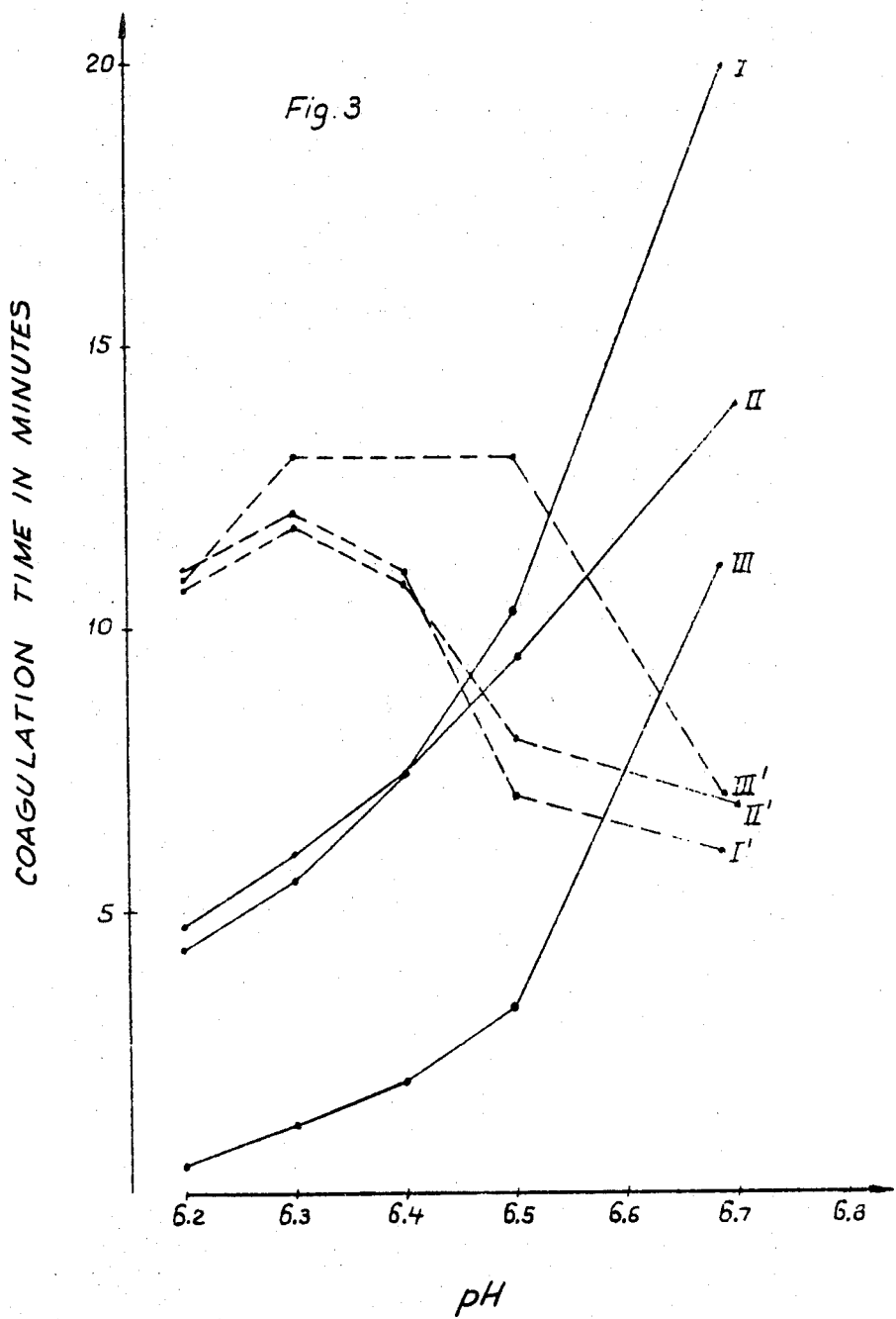

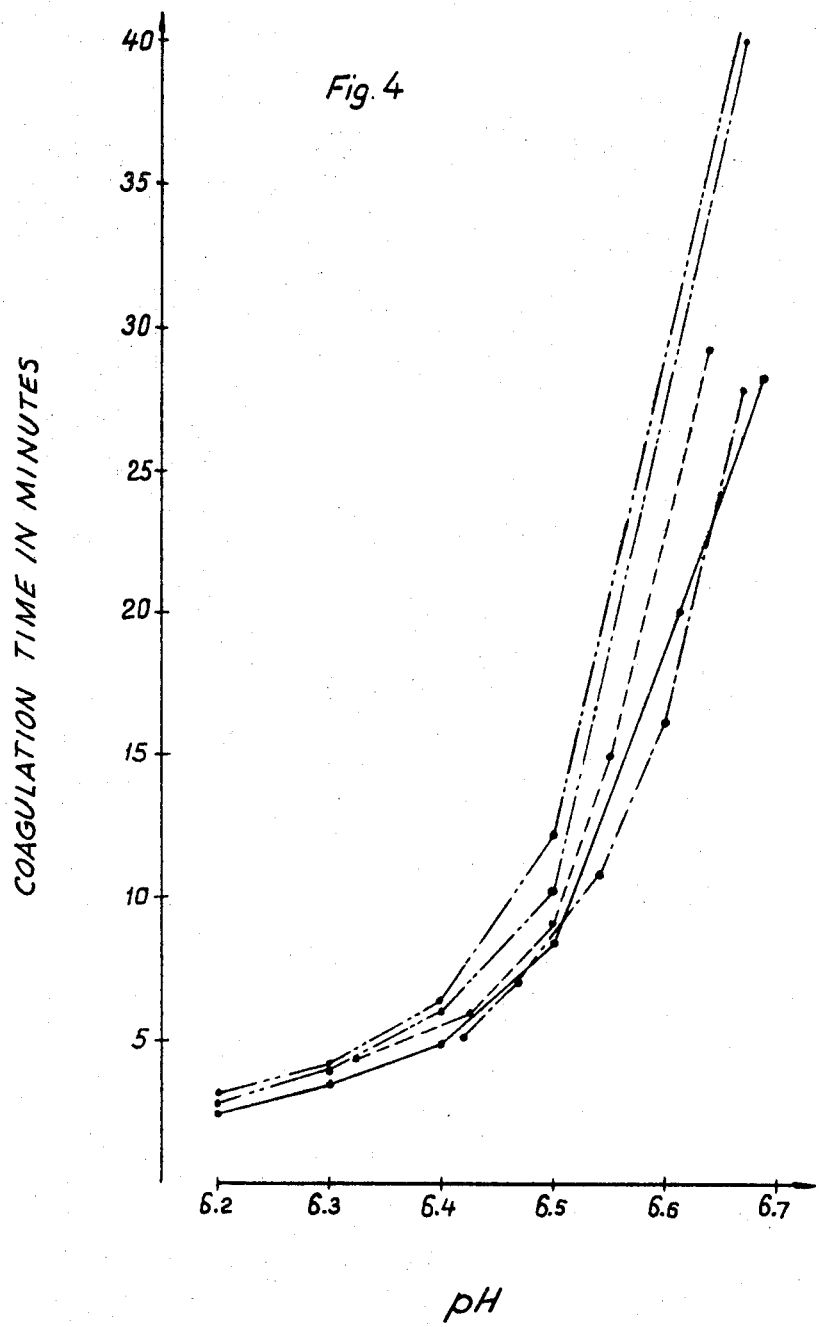

3,560,224
METHOD OF MAKING CHEESE
Carl Olof Claesson and Ella Marjory Helena Claesson, Uppsala, Sweden, assignors to Alfa-Laval AB, Tumba, Sweden, a corporation of Sweden
Continuation-in-part of application Ser. No. 611,879, Jan. 26, 1967. This application Sept. 16, 1969, Ser. No. 858,492
Claims priority, application Sweden, Jan. 28, 1966, 1,169/66
Int. Cl. A23c *19/02*
U.S. Cl. 99—116      3 Claims

ABSTRACT OF THE DISCLOSURE

In the processing of milk to produce cheese, it is initially treated by adding carbon dioxide thereto, preferably until the milk acquires a pH value of about 6.0 to 6.5, whereby differences in the coagulation properties of different batches of milk are reduced, the coagulation time is reduced and a well developed curd is obtained.

---

Figure 1:
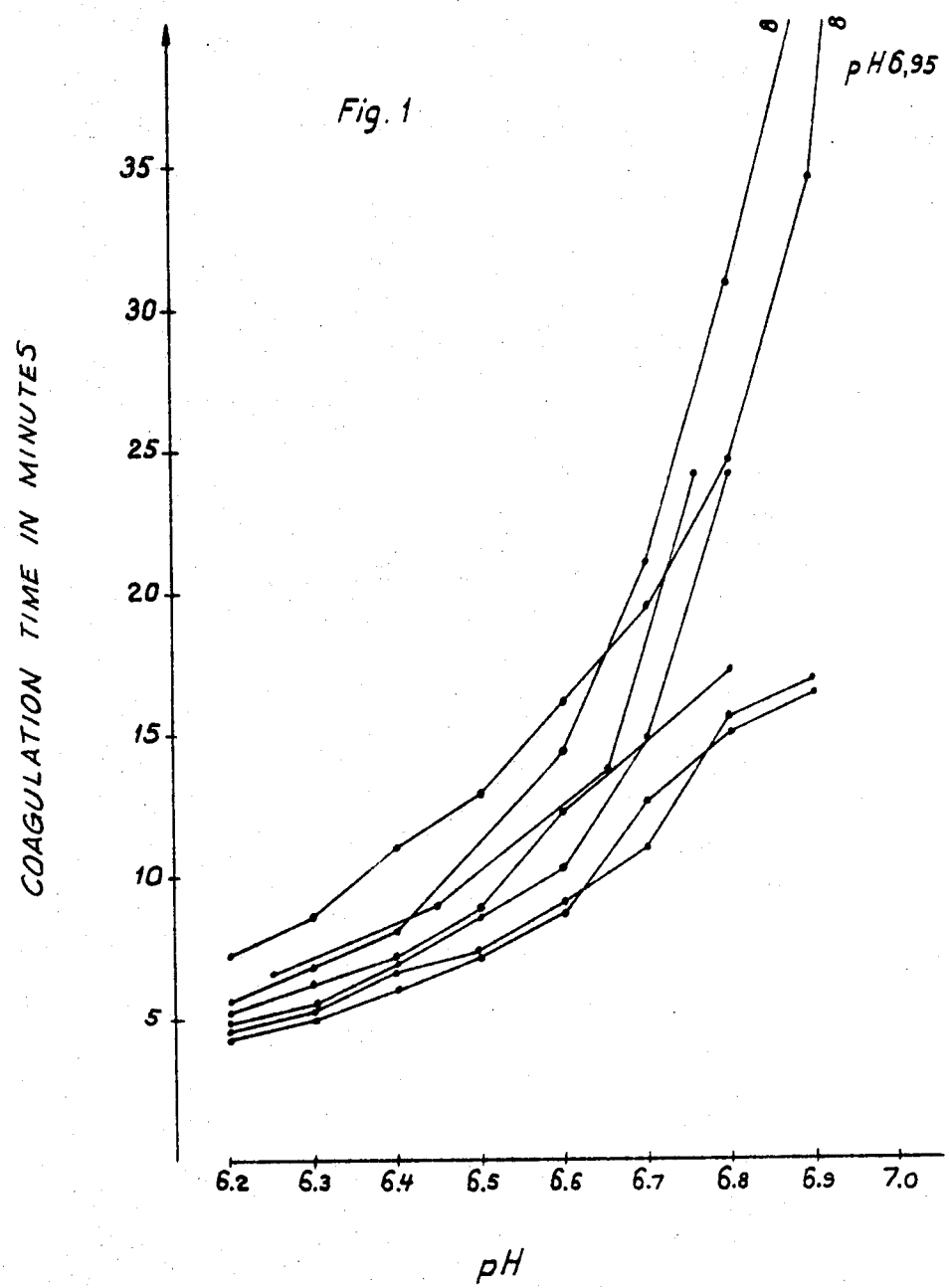

This invention relates to the production of cheese and more particularly to an improved method whereby the coagulation time is reduced and a well developed curd is obtained consistently despite variations in the coagulation properties of different batches of milk.

This application is a continuation-in-part of our copending application Ser. No. 611,879, filed Jan. 26, 1967, and now abandoned.

The composition and properties of milk present very great variations between different breeds of cattle and among different specimens of the same breed. There are further considerable variations at different lactation periods of one and the same cow; and the feeding, the tending and the condition of health of the udder also have a very great influence upon the composition and properties of the milk. Even if some of the variations are equalized in the milk weighed in at the dairies by the mixing of milk from different producers, these uncontrolled variations in the properties of the raw material are nevertheless a great disadvantage in connection with the further processing of the milk for the production of various products and milk for liquid consumption. In particular the possibilities of employing continuous and in other respects rational methods in connection with the dairying are impaired.

In connection with the production of the milk, measures taken for the purpose of changing the composition and properties of the milk in a way that would suit the dairying industry are generally very expensive and time-consuming. This refers particularly to measures taken with reference to the breeding. To the extent that it is possible, therefore, it is generally less expensive to eliminate the above-mentioned variations by means of dairy technological activities. One example of the latter is the standardization of the fat content, whereby changes of the relationship between fat and protein as well as changes of the fat content can be quickly achieved. Pasteurization, which is a standardization and improvement of the bacteriological quality of the milk, is another example of an effective dairy technological method.

On the other hand, practical measures used in the production of the milk or in the dairying industry often result in such changes in the treatment of the milk that its quality is considerably impaired in several important respects. Among such measures are machine milking, transport through long ducts under vacuum or by means of pumping, long periods of storage in cooled containers under stirring, etc.

It is particularly in one connection that the variations of the properties of the milk have been observed for a long time, as they entail considerable drawbacks whether they result from characteristics of the milk-delivering animal or from methods utilized in connection with the processing of the milk. This is in connection with the making of cheese, for the variations of the properties of the milk cause corresponding variations in the rennet coagulation process. It is particularly the time needed for completing the rennet coagulation process that has varied considerably. This has, of course, involved great difficulties when attempting to effect a continuous method of production. The curd formed in the cheese-making has also had varying qualitative properties, due to the fact that a constant temperature for the rennet addition and a constant coagulation time are desired in the cheese-making process. As the milk used for cheese-making consists of a mixture of milk from different stocks of cows in differing lactation periods, the development of the curd may be interrupted in widely differing development phases. It is at present impracticable to determine the properties of the milk and, in accordance with the obtained values, change the temperature, time or rennet quantity in the cheese-making. A method of reducing this originally very large variation is therefore important for improvement of the cheese-making. Such a reduction of the variations diminishes the losses of fat and protein in the whey and makes it possible to control the properties of the curd for the particular kind of cheese to be produced. The present shortage of rennin from animal sources is likely to grow worse; and although great efforts are being made to find substitute enzymes of vegetable origin, these efforts have not led to useful results. Every measure to improve the coagulation properties of the milk also involves possibilities for saving of rennin.

It has long been known in the art that addition of acids (lowering of the pH value) speeds up the rennet coagulation. This reaction consists of two parts, namely, the enzymatic phase in which the rennin causes the milk casein to split, and the following coagulating phase in which the main part of the casein is precipitated by the calcium-ions of the milk. According to prior investigations, only the enzymatic phase is influenced by the hydrogen-ion concentration, while the coagulation phase as far as known is independent of the pH value. The known methods generally consist of adding acids or acid salts to the milk when adding rennet to the milk. These methods, however, have not been successful because the dosing usually gives rise to local excessive concentrations and accompanying changes in the curd produced, and removal of the excess acid entails difficulties. Also, it has been possible only to influence the rate of the enzymatic phase rather than to accomplish the necessary change of the coagulation course to influence the curd structure. The result of the coagulation phase (i.e., the structure and properties of the curd produced) is only insignificantly dependent upon the rate of the enzymatic phase. The properties of the curd depend upon diffusible substances, as yet undefined, which determine the dispersity state of the calcium-casein and calcium-phosphate complex in the milk. The result of the coagulation phase determines to a great extent the properties of the curd, as regards the structure and syneresis. These properties have a determining influence on the qualitative course of the cheese-making, that is, the losses in the whey and the properties of the curd for the subsequent working to cheese.

It has been shown by H. Hostettler and H. R. Ruegger, among others, that addition of calcium chloride to slowly coagulating milk, in order to lower the coagulation time, will result in a curd having a lower calcium content, which has a negative effect when the further processing to cheese starts. It has not proved possible to add acids or acid salts in such a way as to enable proper control of the cheese-making process and thus provide a continuously working process. At present, the cheese-making takes place in vats or tanks during a certain time after the addition of rennet and before the cutting of the curd. A curd that is poorly developed will then cause great losses of fats and proteins in the whey and, in addition, curd structures will be obtained that make a poor starting material for the cheese ripening process (widely varying water contents). In order control the processing in a better way, a method has been developed comprising the steps of keeping the milk cooled to about 0–5° C. and then adding the rennet, which acts at this low temperature. Under these conditions, no coagulation takes place. When this first phase has been completed (the enzymatic phase), the milk is caused to coagulate practically instantaneously by raising the temperature to 30 or 35° C. However, it has proved very difficult to obtain a satisfactory curd structure by this method, since the cooling of the milk impairs the curd structure.

It is one object of the present invention to eliminate the drawbacks in cheese-making which are associated with variations in the quality of the milk resulting from natural causes as well as from present methods of handling the milk. This can be achieved by adding carbon dioxide ($CO_2$) to the milk from which the cheese is to be made. In this way, a substantial reduction is obtained in the differences in milk coagulation properties attributable to different specimens of cows or different stocks and to different location periods, and also the coagulation time is reduced and a well developed curd is obtained. Preferably, the pH value of the milk is adjusted to about 6.0 to 6.5 by this addition of carbon dioxide.

Figure 2:
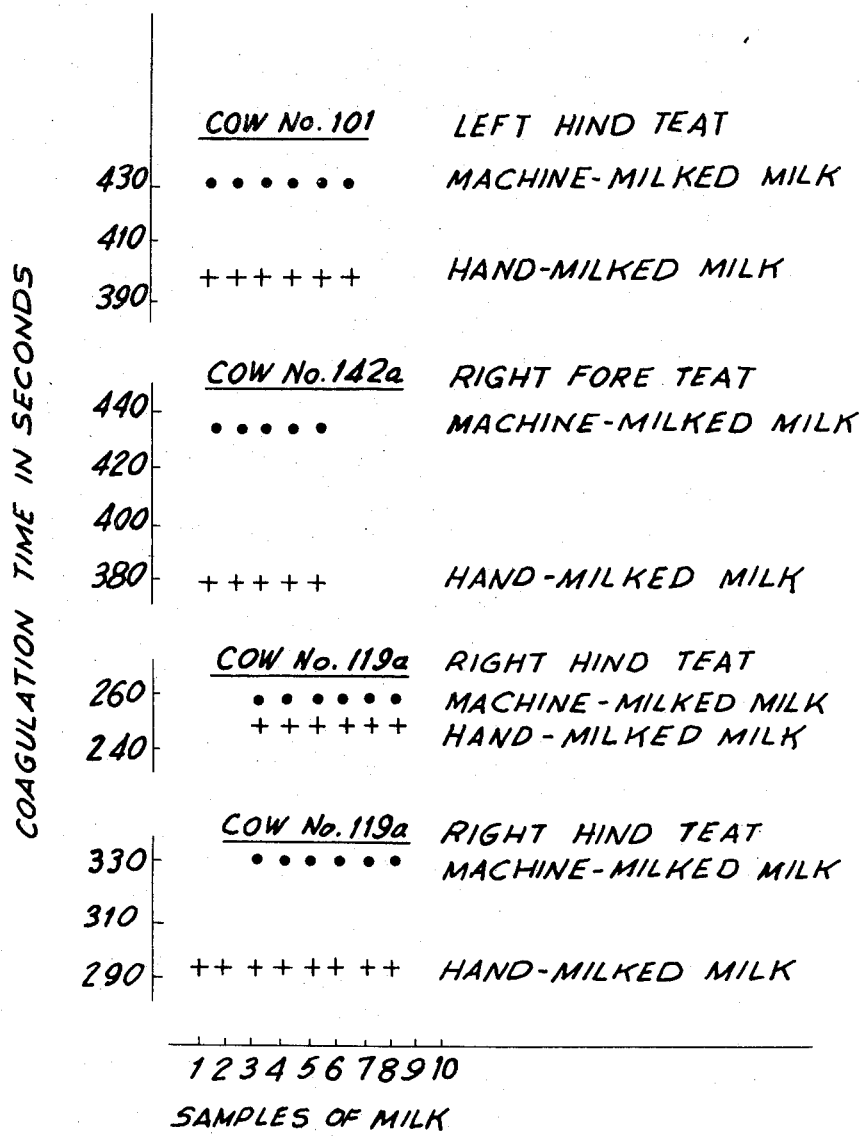

The invention will be further explained with reference to the accompanying drawings in which FIG. 1 is a diagram showing the time of coagulation of milk from different cows at different pH values of the milk, FIG. 2 is a chart showing comparisons of coagulation times for milk from the same cows that have been machine milked and hand milked, respectively, FIG. 3 is a diagram showing how coagulation time and syneresis vary with the pH value of the milk, and FIG. 4 is a diagram showing the time for coagulation of the milk with pepsin at different pH values of the milk.

Referring to FIG. 1, the curves there shown indicate the coagulation time for different milk samples after rennet addition at different pH values of the milk, where the pH value has been adjusted by bubbling carbon dioxide through the milk. It appears from the diagram that the coagulation time diminishes rapidly as the pH value of the milk is lowered. At a pH value of 6.5, for example, the variation in coagulation time between different milk samples is only 6 minutes, which means both a favorable standardization and an actual reduction of the coagulation time. It also appears from the diagram that milk which is non-coagulating (i.e., the coagulation time is infinite) can be made to coagulate in about 35 minutes after a slight change of the pH value (0.05 unit).

An adjustment of the pH value by bubbling carbon dioxide through the milk thus has a marked effect upon the rennet coagulation time. This effect is caused by the more rapid course of the enzymatic phase, but apart from this an anion effect is achieved which brings about changes in the ion environment of the calcium-caseinate and calcium-phosphate complex. These changes are probably caused by the carbonic and hydrocarbonic ions, which influence the course and result of the coagulation phase. We have found that the addition of carbon dioxide brings about the liberation of substances that directly influence the aggregation of the casein during the coagulation, whereby the curd structure is influenced in a desired direction.

The following Table 1 shows the reduction of the coagulation time in sec./0.1 pH for different milk samples after addition of different pH-lowering substances.

TABLE 1

| Milk sample No. | HCl, sec./0.1 pH | Lactic acid, sec./0.1 pH | $CO_2$, sec./0.1 pH |
|---|---|---|---|
| 1 | 158 | 140 | 254 |
| 2 | 181 | 215 | 242 |
| 3 | 489 | | 550 |
| 4 | 424 | | 472 |

It appears from the above table that the addition of $CO_2$, in addition to the pH effect, has a specific influence on the coagulation course. Probably the casein aggregation is influenced by the hydrocarbonic ion. When the properties and syneresis of the curd were determined according to Koestler, the curd obtained from milk treated with $CO_2$ had better values throughout.

In order to reduce the coagulation time in slowly coagulating milk, $CaCl_2$ has been added heretofore in connection with cheese-making. With regard to the properties of the curd, the addition is usually limited to a maximum of 20 grams per 100 kilograms of milk. The following Table 2 shows a comparison between the effect on coagulation time after addition of $CaCl_2$ (20 g./100 kilo milk), which brings about a pH lowering of 0.04 units, and $CO_2$ to different pH values. In this table, reduction (−) of the coagulation time is stated in percent of the original time.

TABLE 2

| Sample No. | Original coagulation time, sec. | $CaCl_2$, percent | $CO_2$, percent |
|---|---|---|---|
| 1 | 696 | −12 | −21(pH 6.69→6.60) |
| Normal milk | | | −41(pH 6.69→6.50) |
| 2 | 1,780 | −27 | −40(pH 6.73→6.52) |
| Mastic milk | | | −56(pH 6.73→6.42) |

The addition of $CO_2$ allows control of the coagulation in a considerably wider field than the addition of $CaCl_2$.

Different milk samples may at the same pH show a great variation in coagulation time. In order to reduce the coagulation time of the slow-coagulating milk samples, Ca-ions at hand are evidently needed among other things. Through the addition of carbon dioxide, the Ca-ions of the milk are accessible according to our investigations, and consequently the coagulation phase is influenced in an advantageous way.

When mineral acid or calcium-chloride is added to milk for cheese-making, there is a risk of increased losses of calcium salts in the whey, which has a negative effect upon the properties of the curd. This injurious effect may eventually be caused by the local overdosages which take place when mineral acid or calcium-chloride is added and which may injure the calcium-caseinate and the calcium-phosphate complex in the milk.

An important advantage of the method of conditioning the milk to be curdled by addition of carbon dioxide lies in the fact that the pH value can easily be uniformly adjusted even in a large quantity of milk, partly due to the fact that carbonic acid is a very weak acid and partly on account of the simplicity of removing a possible excess. This is easily accomplished by bubbling through the milk an inert gas, such as nitrogen, whereby the milk cannot be influenced unfavorably. The pH value may, if desired, also be increased in a later phase of the cheese-making process.

By controlling the pH value with the aid of carbon dioxide and nitrogen during the coagulation process, it is possible to develop a coagulation time and a curd structure suitable for each special kind of cheese. This principle also makes a continuous process in a through-flow system possible, in which the pH value of the milk and thus its rennet coagulation time can be governed exactly in a predetermined manner and controlled automatically by means of traditional process controlling technique.

The milk seems to be impoverished as to its natural carbon dioxide content during its handling according to modern practice. It appears from FIG. 2 of the drawings that machine milking, for instance, has a marked effect upon the properties of the milk. This chart is based upon coagulation experiments with milk from four different cows and compares the coagulation time of milk obtained by machine milking and milk obtained by hand milking. The different milk samples were obtained first by machine milking and then by interrupting the latter and acquiring new samples by hand milking. In this way, samples of both kinds were obtained from the same animal at practically the same point of time. The values plotted in the chart are medium values from a very large number of trials. A long series of trials shows that the coagulation time of milk obtained by machine milking is on the average 10% longer than that obtained by hand milking. The machine milking was effected by means of pail milking machines; and greater differences in the coagulation time would have developed if the milk had instead been obtained by means of a pipeline milking plant.

FIG. 3 shows diagrammatically the relation between coagulation time for milk samples to which rennin (graph I and II) and pepsin (graph III) have been added and pH value for the milk and the relation between the syneresis from the corresponding curd formed through coagulation time for milk samples to which rennin (graph (graph III') at different pH values. The pH adjustment was made with carbon dioxide. The syneresis is a measure of the properties of the curd and a rapid syneresis is valuable in connection with cheese-making. From this diagram it appears that the properties of the curd are improved when the pH value of the milk is lowered with carbon dioxide. It also appears from this diagram that the coagulation with another proteolytic enzyme is influenced in the same favorable way by a pH lowering with carbon dioxide.

FIG. 4 shows the relation between coagulation time, when coagulating with pepsin, and pH value for milk which has been treated in different ways after the milking. A lowering of the pH value of milk for liquid consumption has no negative secondary effects, but instead pepsin-coagulation is more easily achieved, which facilitates the assimilation of the protein in the stomach. This is especially noticeable for pasteurized milk, such as sterilized milk. The pepsin coagulation is far more sensitive than the rennet coagulation, and therefore the pepsin coagulation of present day milk will fail very frequently. This means considerable inconveniences in connection with liquid consumption of milk. The present day milk should evidently be kept in the stomach for a far longer time than herefore in order to coagulate. Patients who have been operated for gastric ulcer, to remove the lower orifice of the stomach, are thus unable to consume milk because it arrives in the bowels too quickly and without the preparatory digestion in the stomach made possible by the pepsin coagulation. They suffer colic-like pains. This impoverishing of the milk as to its carbon dioxide content, which takes place during handling, pasteurization and standardization, has the result that the pepsin coagulation is considerably delayed in milk for liquid consumption.

The lactic acid bacteria occuring in the milk are of great importance for the necessary ripening process which takes place after the actual curdling process. Cultures of lactic acid bacteria and aroma bacteria, mainly *Streptococcus Cremoris* and sometimes *Streptococcus Durans*, are added to the milk in order to bring about the necessary acidification. The milk to be curdled contains large quantities of lactose and an effective way of reducing this unwanted quantity is through a fermentation with lactic and bacteria. It is already known that the growth of these cultures is very poor at a low carbon dioxide pressure. It has now been found quite consistently that this growth of the cultures, and consequently the ripening process of the cheese as well, are very favorably influenced by the conditioning of the milk through addition of carbon dioxide.

The means for adding carbon dioxide to the milk may be quite simple and consist of a carbon dioxide bomb, an injection tube on the cooling tank, and a pH measuring device arranged to control a solenoid valve which in turn is arranged to control the gas flow. The solubility of the carbon dioxide in the milk is sufficiently good to make it possible to maintain a satisfactory concentration without storing the milk under pressure in sealed containers, particularly as the milk is always stored in a cooled condition. Another simple way of adding the carbon dioxide is to add one or more briquettes of carbon dioxide snow to the cooled milk in a storage tank provided with a stirring means. The carbon dioxide snow may be enclosed in a perforated container of stainless steel, which will sink to the bottom of the tank. The cooling of the milk will also take place quicker in that way. Other arrangements for the same purpose may be somewhat more elaborate and may include, for example, separate devices for injecting into the milk metered amounts of carbon dioxide gas and an inert gas such as nitrogen, respectively, whereby the carbon dioxide content of the milk may be increased or decreased at will during a particular stage of the processing.

The method according to the invention may, for example, be performed in the following manner for the production of hard, round-eyed cheese (Emmenthaler type).

EXAMPLE

The equipment used for this example comprises a vat having a capacity of 4,000 to 6,000 liters and adapted to heat its content by means of heating coils in the jacket of the vat. As is conventional for cheese-making, the vat is also equipped with an agitator for stirring. For the purpose of this example, the agitator is provided with a conduit connected to a tube for carbon dioxide gas, and the gas supply is controlled by a pH meter through a solenoid valve. The cutting of the curd is effected by a device mounted on the agitator.

In the production of round-eyed cheese, 3,000 liters of pasteurized milk are introduced into the vat and the temperature is adjusted to 32° C. The pH value of the milk is adjusted with carbon dioxide to 6.5–6.4 while stirring. Thereafter, lactic acid and aroma bacteria and 0.5 liter of rennet are added while stirring. After 30 minutes, the curd is cut and the temperature is raised to 42° C., and thereafter the whey runs off while the curd under working is tapped into molds.

We claim:

1. In the production of cheese by treating milk to effect coagulation and formation of curd, the improvement which comprises adding carbon dioxide to the milk in an amount sufficient to bring the milk to a pH value of 6.0 to 6.5 prior to said coagulation, whereby the coagulation time is reduced, differences in coagulation properties of different batches of the milk are reduced, and a well developed curd is obtained.

2. The improvement according to claim 1, in which the carbon dioxide is added by bubbling carbon dioxide gas through the milk.

3. The improvement according to claim 1, in which the carbon dioxide is added in the form of carbon dioxide snow.

References Cited

UNITED STATES PATENTS

| | | | |
|---|---|---|---|
| 579,866 | 3/1897 | Elworthy | 99—79 |
| 994,641 | 6/1911 | Hansen | 99—189 |
| 1,912,439 | 6/1933 | Feller | 99—79 |
| 3,411,920 | 11/1968 | Holder et al. | 99—116 |

LIONEL M. SHAPIRO, Primary Examiner

D. M. NAFF, Assistant Examiner

U.S. Cl. X.R.

99—151